United States Patent [19]

Smith

[11] 4,349,864
[45] Sep. 14, 1982

[54] LIGHTED PLANT STAND

[76] Inventor: Phillip H. Smith, 7511 Harold Ave., Minneapolis, Minn. 55427

[21] Appl. No.: 238,155

[22] Filed: Mar. 2, 1981

Related U.S. Application Data

[63] Continuation of Ser. No. 21,432, Mar. 19, 1979, abandoned.

[51] Int. Cl.³ .............................................. F21P 1/02
[52] U.S. Cl. ..................................... 362/122; 362/218;
362/355; 362/223; 362/805; 362/226; 362/154;
362/240; 362/267; 362/294; 362/311
[58] Field of Search ............... 362/122, 123, 218, 223, 362/226, 267, 294, 311, 355, 805, 240, 154

[56] References Cited

U.S. PATENT DOCUMENTS

| | | | |
|---|---|---|---|
| 1,215,986 | 2/1917 | Pohlman | 362/154 |
| 2,298,961 | 10/1942 | Miller | 362/217 |
| 2,432,632 | 12/1947 | Seibel | 362/122 |
| 2,511,440 | 6/1950 | Long | 362/222 |
| 2,586,625 | 2/1952 | Downey | 362/217 |
| 2,645,709 | 7/1953 | Thorstensen | 362/217 |
| 2,718,587 | 9/1955 | Charleston | 362/222 |
| 2,720,056 | 10/1955 | Levy | 362/122 |
| 2,723,341 | 11/1955 | Greenspan | 362/154 |
| 3,141,620 | 7/1964 | Guggemos | 362/222 |
| 4,004,144 | 1/1977 | Chako | 362/218 |

FOREIGN PATENT DOCUMENTS

| | | | |
|---|---|---|---|
| 766379 | 6/1934 | France | 362/122 |
| 454604 | 10/1936 | United Kingdom | 362/122 |
| 812394 | 4/1959 | United Kingdom | 362/122 |

*Primary Examiner*—Peter A. Nelson
*Attorney, Agent, or Firm*—Norman P. Friederichs

[57] ABSTRACT

A lighted plant stand (1) for holding a houseplant of the type which hangs or vines downwardly from the plant pot or extends outwardly therefrom. A base (2) adapted for placement on a floor, table or other supporting surface is provided with an upstanding central support (65) or a central cylinder (19), which may be provided with a reflective surface. A pot-like plant container (3) or flat plant holder (101) is spaced upwardly of the base (2). An outside cylinder member (4) is mounted on the outer edge of the base (2) and the plant container (3) rests on the upper end of the outside cylinder member (4). A pair of elongated fluorescent lights (13) are mounted between the base (2) and the plant container (3) between the outside cylinder member (4). The central cylinder (19) and the outside cylinder member (4) are formed with apertures for ventilating the lights (13). A circular fluorescent light (41) may be alternatively mounted in the stand (1), and the device may also be formed in a polygonal configuration.

34 Claims, 15 Drawing Figures

U.S. Patent  Sep. 14, 1982  Sheet 1 of 3  4,349,864
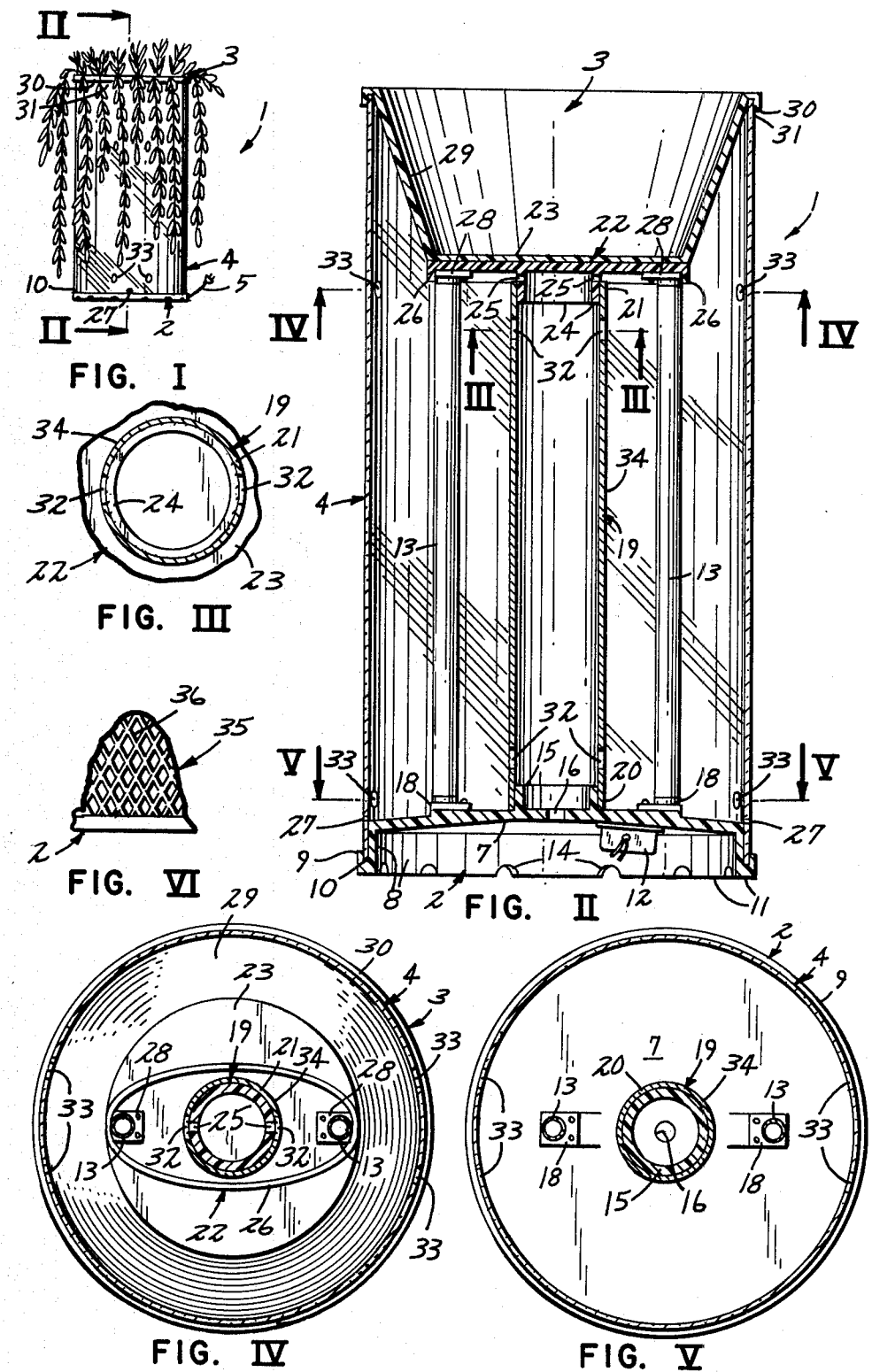

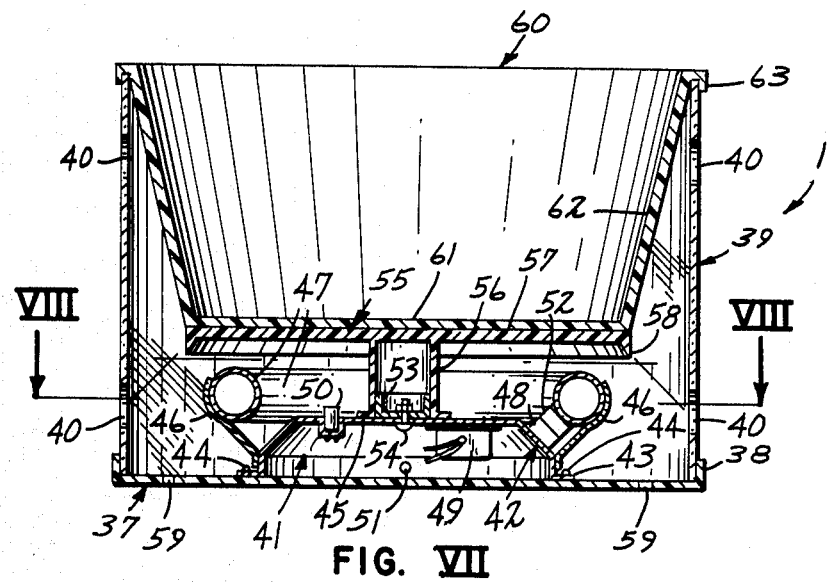
FIG. VII
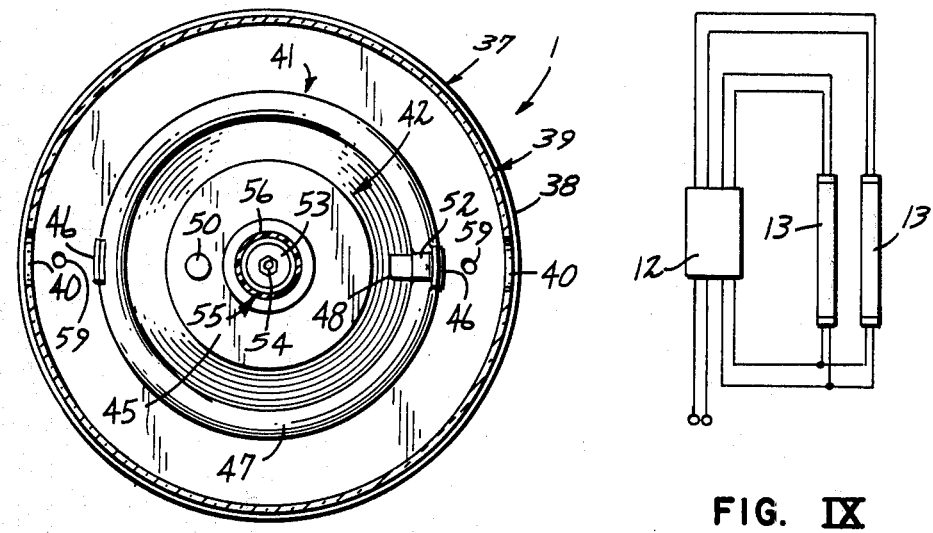
FIG. VIII
FIG. IX

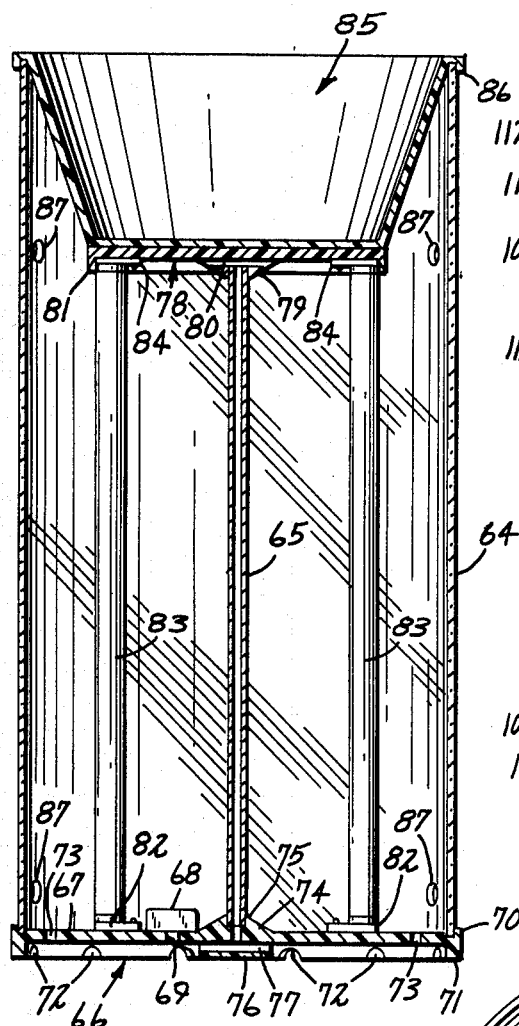
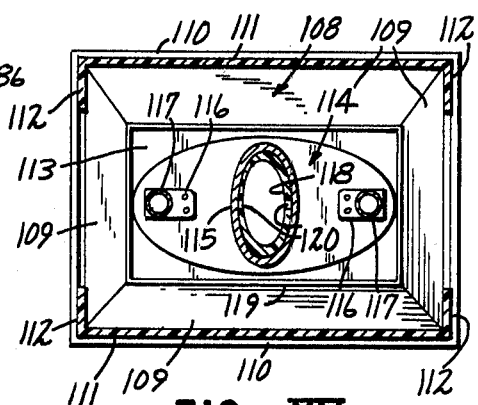
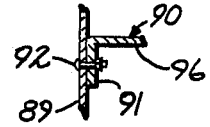
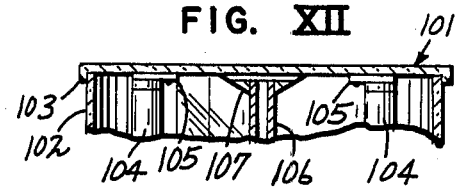
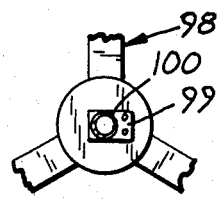
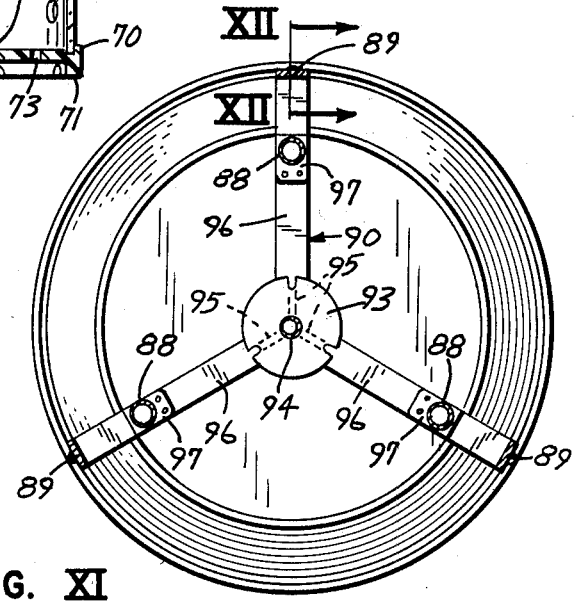

LIGHTED PLANT STAND

This is a continuation of application Ser. No. 21,432, filed Mar. 19, 1979, and now abandoned.

TECHNICAL FIELD

The present invention relates to plant stands or containers for holding decorative plants. More specifically, the present invention relates to a plant stand or receptacle which is primarily designed for growing hanging-type house plants and which is provided with a fluorescent light source to aid plant growth and provide an attractive back-lighted effect for the plant foliage.

BACKGROUND OF THE PRIOR ART

Numerous types of plant containers are known in the prior art, including plant containers or stands which are provided with artificial light for plant growth. However, previous types of lighted plant containers known to me do not have the features and advantages of the present invention.

There has been in the last few years an increasing interest in garden plants in general, and in the growth of house plants in particular. However, many homes and offices do not have the necessary window light or artificial light desirable for good plant growth and development. House plants need varying amounts of light and plants clustered near a window often present a cumbersome arrangement and must periodically be rotated for even growth. House plants may be grown entirely under artifical light, but previously known lighted containers or stands are unwieldy, often expensive, not particularly aesthetic, nor subject to easy placement or movement for arrangement within the home or office decor.

Attractive vertical plant stands for carrying a hanging or vining plant at the top are well known (such as those produced by Ingrid Ltd. of Chicago, Ill., or Walton Corkwood, Inc. of Newport Beach, Calif.), but without a close supplemental light source it is difficult with such units to maintain good plant growth over a reasonable period of time. Most homes and offices do not have adequate available natural or artificial light to sustain good plant growth. In addition, many people who purchase plants do not have knowledge of the varying light requirements of the many types of available house plants.

One type of lighted planter is shown in U.S. Pat. No. 3,030,735, which includes a vertical pole to which are attached separate lighted pots or plant containers. The arrangement of the lights to the various containers provides problems of heat, electrical safety, and ineffective plant display.

Another type of lighted plant container is shown in U.S. Pat. No. 1,449,772, wherein a table lamp is provided with an enclosed glass globe or jar for display of plants or fish inside the container.

Another type of ornamental stand for display of plants is shown in U.S. Pat. No. 3,174,688, which includes a lighted central unit displaying liquid droplets and adapted to hold plants about the perimeter.

None of the above devices nor other lighted plant containers known to me have the advantages and features of the present invention.

SUMMARY OF THE INVENTION

The present invention is directed to a lighted plant stand or plant receptacle having a base and an upwardly spaced container for holding or growing a house plant and provided with an electric light disposed between the container and the base for lighting the plant foliage hanging from the container. More specifically, the device includes a base for placement on a floor, table or other surface, a pot-like container spaced upwardly from the base for holding a house plant of the hanging or vining type having foliage growing over the sides of the container, one or more electric lights mounted between the base and the bottom of the plant container, and a vertical support holding the plant container above the base.

The invention is generally referred to herein as a plant stand or plant receptacle and it is understood that such terms refer to the embodiments of this invention whether adapted for placement on a supporting surface or for hanging or both. The invention has particular utility as a unit resting upon a supporting surface but all embodiments may also be used as hanging units by coupling a commonly available pot-hanger, not shown.

In a preferred embodiment, the plant stand is in a vertical cylindrical form, the base is circular and has a base plate formed above the cylindrical side wall having an up-turned annular edge flange providing a recess to receive the lower end of a vertical outside cylinder member, which is formed of a light pervious material, such as transparent, translucent or perforate material. The base is adapted to carry a fluorescent light ballast (transformer) mounted within the chamber below the base plate. An upstanding central cylinder extends upwardly from the central portion of the base and is of a length generally corresponding to fluorescent lamps vertically mounted above the base and outwardly from the central cylinder. The central cylinder is preferably provided with a reflective or mirror surface, and the base and central cylinder are provided with apertures at the bottom and top for ventilating the light ballast. At the upper end of the central cylinder is mounted an upper support member the upper surface of which supports the plant container. On the upper surface of the bottom base plate and on the lower surface of the upper support member are mounted aligned fluorescent connector fixtures for electrically connecting at least a pair of upstanding fluorescent light tubes spaced laterally between the central cylinder and the outside cylinder member. The pot-like container is of the usual truncated conical shape with a generally flat bottom and upwardly diverging side wall, and its outer surface may be provided with a reflective or mirrored finish. The upper circular edge of the plant container is provided with a downturned edge flange for fitting over the outside cylinder member which extends between such edge and the outer up-turned lip or flange on the base. The upper support member is provided with a down-turned drip edge about its perimeter and the fluorescent lights are preferably mounted inwardly of such drip edge. The outer cylinder member is provided with apertures adjacent the base and also near the top for ventilating the interior of the plant stand and permitting heat from the ballast and the fluorescent lights to escape. Electrical wires are connected between the fluorescent connector fixtures and the ballast, with the top wires extending through the central cylinder, and with an electrical wire extending through the base and provided with a male plug for connection to a common electrical outlet, preferably through a common timer for switching the lights on and off at a pre-set daily period.

In all embodiments, the interior of the plant stand may be provided with one or more fluorescent lights or incandescent lights, or a combination thereof, with fluorescent lights being preferred over currently available incandescent lights because of the greater heat produced by the latter. In all embodiments, the wattage of the lights is preferably balanced between an upper amount desirable for suitable plant growth and development and back lighting of the plant leaves, and a lower amount which will not overly encourage the inward growth of plant leaves in the average room having some natural or artifical light besides that within the stand. The optimum wattage of the lights will vary depending on the height and width or diameter of the plant stand and the location of the lights therewithin, with approximately 20 to 30 watts of fluorescent light being the optimum per foot of plant stand height for a 10-inch diameter stand wherein the fluorescent lights are spaced outwardly from the center approximately 50 to 75 percent of the radial distance of the stand.

In another embodiment, the outside cylinder member is formed from screen or reticulate material, such as sheet metal or plastic, and is provided with numerous apertures for permitting passage of light from the lamps mounted within the plant stand. The reticulate screen material for the outside cylinder member for this emobdiment may be formed with various aperture shapes, patterns and designs, and this embodiment may be more attractive or aesthetically pleasing to some users or in some decors than the more contemporary translucent cylinder of the preferred embodiment. The inside surface of the reticulate material for the outside cylinder member may be coated or provided with a mirrored or reflective material or surface to reduce absorption of the light and reflect the same back inwardly for redirected outward reflection, so that more light may pass through the reticulate screen.

In another embodiment, the plant stand base is formed in a generally flat shape without any base chamber, and the fluorescent light ballast is mounted within the central cylinder.

In a further embodiment wherein the base is formed in a generally flat configuration without any base chamber, the central cylinder is eliminated and the fluorescent light ballast is mounted directly on the upper surface of the base. A vertical rigid tube or pipe of small diameter is mounted between the base and carries an upper support member beneath the pot-like container. The vertical tube or pipe is provided to increase vertical support for the plant container and also carry the electrical wiring for the upper end of the electrical light.

In a still further embodiment, the plant stand is provided with only a single fluorescent tube disposed generally vertically within the outside cylinder member, with the support for the upper end of the light being carried by the outside cylinder member and the ballast mounted within or on the upper surface of the base.

In a still further embodiment, the plant stand is made in the form of a square, rectangle or polygon in horizontal cross-section, rather than circular as in the preferred embodiment.

In another embodiment, which is more adapted for placement or display on a table, desk, shelf or other surface besides a floor, a circular type fluorescent light is mounted within the plant stand between the pot-like container and the base about the central axis, to provide a circular light within the outside cylinder member.

In another embodiment, the plant receptacle is provided with a hanger and is constructed for use as a hanging unit as well as or in lieu of placement on a supporting surface.

In a further embodiment, the outside cylinder member is replaced by at least a pair of upwardly extending struts or bars between the base and the plant container, with an upper support member mounted or carried between such struts, and the upper support member mounting the upper end of the fluorescent lights and providing support for the plant container. The upper support member extends between the struts and may be in a configuration to mount one or more lights.

Various advantages and features of novelty which characterize the invention are pointed out with particularity in the claims annexed hereto and forming a part hereof. However, for a better understanding of the invention, its purposes and advantages provided by its use, reference should be made to the drawings which form a further part hereof, and to the accompanying descriptive matter, in which there is illustrated and described preferred embodiments of the invention.

BRIEF DESCRIPTION OF THE DRAWINGS

FIG. I is a side elevational view of a plant stand in accordance with the present invention and illustrating the placement of a plant therein;

FIG. II is a vertical sectional view taken along line II—II of FIG. I, some parts being shown in elevation;

FIG. III is a sectional view taken along line III—III of FIG. II;

FIG. IV is a sectional view taken along line IV—IV of FIG. II;

FIG. V is a sectional view taken along line V—V of FIG. II;

FIG. VI is a partial side elevational view similar to a bottom portion of FIG. I and showing another embodiment of the present invention;

FIG. VII is a sectional view similar to FIG. II and showing another embodiment of the present invention;

FIG. VIII is a sectional view taken along line VIII—VIII of FIG. VII;

FIG. IX is a circuit diagram showing the wiring for the embodiment of FIGS. II-V;

FIG. X is a sectional view similar to FIG. II and showing another embodiment of the present invention;

FIG. XI is a sectional view corresponding to FIG. IV but showing a further embodiment of the present invention.

FIG. XII is a detail view of the strut connection of the embodiment of FIG. XI taken generally on the line XII—XII of FIG. XI;

FIG. XIII is a partial sectional view corresponding to the center portion of FIG. XI and showing another embodiment of the present invention;

FIG. XIV is a partial sectional view corresponding to the upper portion of FIG. X and showing a further embodiment of the present invention; and FIG. XV is a sectional view similar to FIG. IV, but showing a still further embodiment of the present invention.

DETAILED DESCRIPTION OF THE INVENTION

Referring to the drawings in detail, wherein like numerals indicate like elements, there is shown in FIG. I a lighted plant stand designated generally as 1. The stand 1 includes a base 2, and a plant container 3 spaced upwardly from the base and provided to hold a plant, as illustrated, either within the container 3 or within another pot, not shown, placed therein. The container 3 is sometimes referred to herein generally as a plant holder 3. An outside cylinder member 4 is disposed between the base 2 and the container 3. An electric light, not shown in FIG. I, is mounted within the outside cylinder member 4 between the base 2 and the container 3 and provided with an electrical wiring 5 to be connected to a standard electrical outlet, not shown. The outside cylinder member 4 is sometimes referred to herein as a vertical support member. The support member 4 may be of any material that will permit a suitable amount of light therethrough. For example, member 4 may be perforate, transparent or translucent. The light of the plant stand 1 may be electrically connected through a standard timer, not shown, for switching the light on and off on a desired daily schedule.

In various embodiments, the plant stand 1 may be formed in various shapes or configurations, such as cylindrical, triangular, elliptical or in other polygonal shapes (as will be described in more detail hereinafter), depending on design style and manufacturing cost.

In the embodiment shown in FIGS. I-V, the plant stand 1 is formed in a generally cylindrical configuration. The base 2 includes a base plate member 7 with a downwardly formed cylindrical side wall 8 provided with an upturned annular edge flange 9 which is formed to retain the bottom edge 10 of the outside cylinder member 4. The bottom edge 11 of the base 2 is designed to rest upon a flat surface, such as a table, floor shelf or desk. The base 2 defines a chamber which is designed to receive a transformer ballast 12 for a pair of fluorescent lights or tubes 13 mounted on the upper surface of the base plate member 7. It is preferable to mount the ballast 12 within the base chamber because its weight provides stability for the plant stand 1, although the ballast 12 may also be otherwise positioned for manufacturing convenience.

The base side wall 8 is provided at its bottom edge with openings 14 for air circulation. The central portion of the base plate member 7 is formed to provide an upstanding shoulder portion 15 and a center aperture 16. The plate member 7 is further formed to slope outwardly and downwardly a slight amount to permit drainage of any leaking water or condensation from the plant container 3. The upper surface of the plate member 7 defines opposed horizontal boss portions, as particularly shown in FIGS. II and V, for mounting standard fluorescent light connector fixtures 18 by suitable fasteners, as indicated. The base 2 may be formed by molding a rigid plastic or other suitable material, or may be stamped from sheet metal or other material.

Connected to the shoulder portion 15 of the base plate member 7 is an upstanding central cylinder member 19, sometimes referred to merely as a central cylinder 19, the lower end 20 of which is secured by fasteners, not shown, to the shoulder portion 15 or friction fitted thereon for rigidity. The purpose of the central cylinder member 19 is to reflect the light outwardly, support the upper portion of the device and also enclose the light wiring. The ballast 12 may also be positioned within the central cylinder 19 if desired. The central cylinder 19 is of a length generally corresponding to the length of the fluorescent tubes 13 for any particular unit, the fluorescent tubes 13 being commonly available in numerous standard lengths.

The upper end 21 of the central cylinder 19 is designed to carry an upper support member 22, to provide mounting for the upper ends of the fluorescent tubes 13 and also to provide additional support for the plant container 3.

The upper support member 22 is shown particularly in FIGS. II and IV and is of a width generally corresponding to the lateral spacing of the fluorescent tubes 13 and the bottom 23 of the plant container 3. The upper support member 22 is provided with a downturned shoulder portion 24 for mounting, by fasteners (not shown) or friction fit, within the upper end 21 of the central cylinder 19. The shoulder portion 24 is provided with opposed openings 25 for receiving electrical wires, not shown, for the upper end of the fluorescent lights. The upper support member 22 is preferably formed in a generally elliptical shape, as shown in FIG. IV, or a rectangular or diamond shape, not shown, to permit easier access to the fluorescent tubes 13 for ease of installation, servicing or replacement. The perimeter of the upper support member 22 is preferably formed with a downturned drip edge 26 whereby any moisture inadvertently entering the upper portion of the device or caused by accidental damage or puncture to the plant container 3, will drain downwardly outside of the fluorescent tubes 13 onto the sloping base plate member 7 and out through small apertures 27 formed in the outside cylinder member 4. The drip edge 26 may alternately be formed on the perimeter of the bottom 23 of the plant container 3. Mounted on the lower surface of the upper support member 22, in general alignment with the lower connector fixtures 18, are a pair of oppositely spaced upper connector fixtures 28 for carrying the upper ends of the fluorescent tubes 13. The connector fixtures 28 may be mounted on the upper support member 22 by fasteners, as indicated in FIGS. II and IV or other suitable means.

If desired for manufacturing or cost reduction, the connector fixtures 28 may be mounted directly on the bottom 23 of the container 3, and the lights 13 installed and serviced through the base 2 by constructing the base plate member 7 with a removably secured section, not shown.

Positioned on top of the upper support member 22 is the plant container 3, which is preferably of a somewhat standard truncated conical flowerpot shape and formed of plastic, sheet metal or other suitable material. The plant container 3 preferably has an upwardly and outwardly diverging side wall 29 to permit light from the fluorescent tubes 13 to be somewhat obliquely reflected upwardly around the perimeter of the plant container 3. The upper edge of the container 3 is formed with a downturned annular edge flange 30 formed to receive the upper end 31 of the outside cylinder member 4. In this embodiment, the diameter of the edge flange 30 on the plant container 3 is generally the same as the diameter of the edge flange 9 on the base 2 so that a more economical constant diameter outside cylinder member 4 may be placed therebetween.

The outside cylinder member 4 is preferably formed from a transparent or translucent material, such as acrylic or Plexiglas, the preferred material being the most durable, lowest cost to manufacture, and permitting the most light to pass therethrough. The outside cylinder member 4 is preferably secured to the base 3 by adhesive or fasteners, not shown, or by rigid fit. The plant container 3 is preferably not secured to the upper end 31 of the outside cylinder member 4, but merely rests thereon so that the container 3 may be easily removed for servicing the fluorescent tubes 13. For convenience, a plant within a standard flowerpot may be placed within the container 3 so that plants may be readily substituted. As seen particularly in FIG. II, the length of the outside cylinder member 4 and the length of the central cylinder 19 are formed of lengths which will correspond to the depth of the plant container 3 and the length of the fluorescent tubes 13 selected for a particular size unit.

The purposes of the outside cylinder member 4 are to provide rigidity for the plant stand, prevent plant leaves from hanging inwardly and possibly shorting the electric lights, protect the lights from damage, and also provide a dust shield. It is therefore preferable that the outside cylinder member be generally closed, although in some embodiments noted hereafter the member 4 may be formed with large openings or merely comprise spaced wall portions.

The central cylinder 19 is provided with upper and lower ventilating apertures 32, and the outside cylinder member 4 is also provided with upper and lower ventilating apertures 33 spaced generally adjacent the upper and lower ends of the fluorescent tubes 13. With the openings 14 in the base side wall 8, the center aperture 16, and the apertures 32, 33, means is provided for ventilating the ballast 12 and the fluorescent tubes 13, whereby the relatively low heat generated thereby may easily escape. It has been found that with these ventilating openings and apertures, the small amount of heat generated is beneficial in that it slightly warms the bottom of the plant container 3, which increases the root development of many plants.

The outer surface 34 of the central cylinder 19 is preferably provided with a reflective or mirrored surface or material, not shown, as may be the outer surface of the container side wall 29 and the upper surface of the base plate member 7, so that light from the fluorescent tubes 13 will not be absorbed by such surfaces but will be reflected outwardly through the outside cylinder member 4 and at least partially upwardly around the outside of the plant container 3. Such reflective surfaces may be formed of various materials, in various reflective colors, and in various patterns, depending upon the decorative or aesthetic design intended for a particular style of unit. The plant container 3 may also be replaced by a generally flat top member for supporting a plant in any suitable sized container, as described more particularly hereafter, or the plant container 3 may be formed with a more constant diameter side wall fitted within the upper end of the outside cylinder member 4. However, the latter alternative may reduce the effect of light being directed upwardly about the perimeter of the plant container 3.

The plant stand 1 may be constructed with various numbers of fluorescent lights, depending upon the size of the unit and the amount of light and lighting effect desired. It has been found, however, that the two-light unit shown in FIGS. II-V produces an acceptable amount of light for sustained plant growth, at a reasonable manufacturing and operating cost for a unit approximately 10" in diameter. This is particularly true when the plant stand is placed in a room with at least some adjacent window or artificial light, which would be the usual condition in most places where a plant stand unit of this type would be utilized. It is contemplated that incandescent lamps may also be employed in the plant stand unit; however, the incandescent lamps currently available are less desirable because they produce less light and more heat per watt than fluorescent lights.

In all embodiments, the wattage of the lights is preferably balanced between an upper amount desirable for suitable plant growth and development and backlighting of plant leaves, and a lower amount which will not overly encourage the inward growth of plant leaves in the average room having some natural or artificial light besides that provided by the present invention. The optimum wattage of the lights will vary depending on the height and width or diameter of the plant stand and the location of the lights therewithin. It has been found that the desired light balance noted above is provided by approximately 20 to 30 watts of fluorescent light per foot of plant stand height for a 10-inch diameter stand wherein the fluorescent lights are spaced outwardly from the center approximately 50 to 75 percent of the radial distance of the stand.

FIG. IX shows a wiring diagram for a two-light fluorescent unit as shown in FIGS. II-V. A two-light ballast 12 is connected by lead wires to a source of line current and connected by other wires as shown to the positive and negative terminals of the opposite ends of the connector fixtures 18 and 28, not shown in FIG. IX, of the fluorescent tubes 13.

A second embodiment of the present is shown in FIG. VI, which generally corresponds to the embodiment shown in FIGS. II-V, except in this embodiment the outside cylinder member 35 is formed of a reticulate screen sheet material 36. The reticulate screen material illustrated in FIG. VI includes numerous apertures through which light from the interior lamps may pass. The reticulate screen sheet material 36 may be formed with virtually any type of opening pattern, style or configuration, depending upon the reticulate lighting effect desired. The screen material 36 may be formed of sheet metal, plastic or other suitable rigid material. It is desirable to form the openings in the outside cylinder member 35 in this embodiment of the largest size possible consistent with the design effect and rigidity desired, so that more light may pass through the cylinder member 35. Also, in some forms, the outside cylinder member may be formed of a transparent or translucent material. However, for durability, it will generally be preferred to form the reticulate screen material 36 from sheet metal or a woven rigid fabric material, in which case the inside surface of the outside cylinder member 35 in this configuration is preferably provided with a mirrored or reflective material so as to reduce absorption of the light from inside the plant stand and reflect the light to the opposite side so that more light may pass through the reticulate screen material 36. The construction and details of this embodiment, except for the outside cylinder member 35, may conform to the other embodiments described herein.

A third embodiment of the present invention is shown in FIGS. VII-VIII, which generally corresponds to the first described embodiment, but is of a shorter design which may be more appropriate for use on a table or desk than the elongated embodiment shown in FIGS. II-V. In this embodiment, the plant stand 1 is constructed with a generally circular base plate 37 having an upturned annular edge flange 38. Fitted within the edge flange 38 is an outside cylinder member 39 secured to the base plate 37 by adhesive or fasteners, not shown. The outside cylinder member 39 is preferably formed from a transparent or translucent material similar to the outside cylinder member 4 of the first embodiment, and is also provided with upper and lower apertures 40 for ventilation in the same manner. Mounted on the base plate 37 is a generally centrally positioned commercially available circular fluorescent light, generally identified by the numeral 41.

In the embodiment of FIGS. VII and VIII, the circular fluorescent light 41 includes a housing 42 having a mounting flange 43 which is secured by fasteners 44 to the base plate 37 of the plant stand 1. The housing 42 is provided with perimetrically spaced support clips 46 adapted to retain a circular fluorescent tube 47. A connecting unit 48 is mounted at one side of the housing 42 and electrically connected by suitable wires to the ballast 49 and a starter 50. The fluorescent light is wired in the usual manner and provided with lead wires, not shown, extending outwardly through an aperture 51 in the edge flange 38 of the base plate 37 to a source of electrical current. The circular fluorescent tube 47 is provided with a terminal connector 52, shown particularly in FIG. VIII, for electrical connection with the connecting unit 48, the circular fluorescent tube 47 being thereby replaceable.

At the central portion of the top plate 45 of the housing 42 is mounted an annular ring 53 by a bolt or other fastener 54. An upper support member 55 is secured by fasteners, not shown, or tight fit about the annular ring 53. The upper support member 55 includes a central leg portion 56 and an upper plate member 57. The upper support member 55 is preferably removably affixed to the light housing 42 for easy servicing and replacement of the circular fluorescent tube 47, or alternatively, a removable central section, not shown, may be provided in the base plate 37 for inspection, removal and servicing of the fluorescent light 41.

The upper plate member 57 of the support member 55 is preferably provided with a downturned annular drip edge flange 58 for directing any moisture, condensation or leakage into the bottom of the unit for drainage through apertures 59 in the base plate 37, generally as noted above with respect to the embodiment of FIGS. II-V. Supported on top of the upper plate member 57 is a plant container 60 in the general configuration as described previously for the embodiment of FIGS. II-V. The plant container 60 has a bottom wall 61, an upwardly and outwardly diverging outside wall 62, which defines a downturned annular edge flange 63. Fitted between the edge flange 63 and the plant container 60 and the annular edge flange 38 of the base plate 37 is the outside cylinder member 39, which may be formed of transparent or translucent material as in the embodiment of FIGS. II-V, or reticulate material as in the embodiment of FIG. 6. In other respects, the embodiment of FIGS. VII and VIII corresponds to the embodiment of FIGS. II-V.

The embodiment of FIGS. VII-VIII may alternately be provided with a hanger, not shown, mounted about the plant container 60, whereby the plant receptacle (referred to generally by the number 1) may be used as a hanging type unit as well as or in lieu of a surface supported unit.

FIG. X illustrates a fourth embodiment of the present invention having an outside cylinder member 64, and in which the central cylinder 19 of the embodiment of FIGS. II-V is replaced by a center support tube 65. In this embodiment, the base 66 is generally flat and includes a base plate 67 upon which is mounted a ballast 68 which may be wired through an aperture 69 in the base plate 67. The base plate 67 includes an upturned annular edge 70 and a downturned base edge 71 provided with ventilating apertures 72. The base plate 67 is also provided with drainage apertures 73 for any moisture leakage or condensation as indicated previously. The base 66 is provided with a central support 74 having an upper portion 75, which defines a recess, and a lower portion 76 resting on the floor or other surface and adding support to the central portion of the plant stand. The lower portion 76 is provided with a diametric bore 77 for reception of wiring for the lighting. At the upper end of the center support tube 65 in this embodiment there is provided an upper support member 78 having a center portion 79 resting on the upper end of the center support tube 65 and provided with a diametric bore 80 for reception of wiring for the lighting. The upper support member 78 is generally circular in configuration and includes a downturned drip edge 81 for drainage of moisture or leakage as indicated previously.

Mounted on the upper surface of the base plate 67 by means of diametrically spaced light connector fixtures 82 are a pair of fluorescent tubes 83, the upper ends of which are received within connector fixtures 84 mounted on the bottom surface of the upper support member 78, generally as indicated in more detail in the embodiment shown in FIGS. II-V. At the upper end of the plant stand in this embodiment is provided a plant container 85 which defines a downturned annular edge flange 86 which rests upon the upper end of the outside cylinder member 64. The cylinder member 64 may be of a transparent or translucent material as described previously for the embodiment of FIGS. II-V or the reticulate material as shown in FIG. VI. The outside cylinder member 64 is provided with upper and lower ventilating apertures 87 for removal of heat from the fluorescent tubes 83 and the ballast 68 within the plant stand. In the embodiment of FIG. X, the wiring for the upper ends of the fluorescent tubes 83 may be extended from the connector fixtures 84 through the bore 80 of the center portion 79 and downwardly through the central support tube 65 for electrical connection through the bore 77 in the lower portion 76 of the base central support 74 and thence with the lower connector fixtures 82 and the ballast 68. This embodiment, by elimination of the central cylinder 19 of the embodiment of FIGS. II-V, may be more economical to produce.

A fifth embodiment is shown in FIG. XI, wherein the central support 19 of the embodiment of FIGS. II-V, is eliminated and the unit is also provided with three circumferentially spaced fluorescent tubes 88 (although only two fluorescent lights may be used as in FIGS. II-V). Also, in the embodiment of FIG. XI, the outside cylinder member 64 of the embodiment of FIGS. II-V is replaced by three circumferentially spaced vertically extending struts 89, which may be referred to as vertical support members or outside support members. The bottom ends of the struts 89 are mounted on a base, not shown, in FIG. XI, and at the upper end portion of the struts 89 is mounted a triangular yoke member 90 shown particularly in FIG. XI and partially in FIG. XII. The outer end portions 91 of the triangular yoke member 90 are vertically turned to provide for mounting engagement with the upper end portions of the struts 89, by means of suitable fasteners 92, shown in FIG. XII. The triangular yoke member defines a central hub portion 93 constructed to rest upon a central support tube 94, as in the embodiment of FIG. X. The central hub portion 93 is provided with wiring bores 95 extending outwardly toward the fluorescent tubes 88 to permit convenient placement of wiring for the lights. On the arms 96 of the yoke member 90 are mounted radially spaced terminal connector fixtures 97 for supporting and electrically connecting the upper ends of the fluorescent tubes 88, the lower ends of which are received within appropriately aligned and mounted connector fixtures on the base, not shown. If desired, the central support tube 94 may be eliminated and the wiring for the upper ends of the lights 88 may be carried by one of the struts 89.

A sixth embodiment is illustrated in FIG. XIII, which generally corresponds to the embodiment of FIGS. XI-XII, except that an upper yoke member 98 is provided upon which is mounted a centrally located terminal connector fixture 99 for electrical connection with a central singular fluorescent tube 100. In this embodiment, the wiring for the single central fluorescent tube 100 may extend outwardly and be carried by the yoke member 98 and downwardly beside a strut, not shown, at the outer side of the plant stand, mounted generally as shown in FIGS. XI and XII.

A further alternate embodiment is shown in FIG. XIV, which corresponds generally to the previous embodiments, but wherein a plant holder is provided in the form of an upper plate member 101 which is preferably formed from a transparent or translucent plastic or glass material adapted to support a plant in a usual pot-like container, not shown, placed thereon. This embodiment has the advantage of eliminating the cost of the plant container of the previous embodiments and permits light to be reflected upwardly around a pot container placed on the upper plate member 101. In this embodiment, the plant stand includes an outside support member 102 which may be in the form of the outside cylinder member 4 of the embodiment of FIGS. II-V, the reticulate sheet material of FIG. VI, or the circumferentially spaced struts of the embodiment of FIGS. XI-XII. The upper plate member 101 is preferably provided with a downward lip portion 103 to fit over the outside support member 102, and mounted underneath the upper plate member 101 is one or more fluorescent tubes 104 electrically connected by means of connector fixtures 105. In this embodiment, the upper plate member 101 may be supported by a central cylinder as in the embodiment of FIGS. II-V, not shown, or may also be mounted on a central support tube 106, which rests upon a central portion 107 of the upper plate member 101, as particularly shown in FIG. XIV.

In a further embodiment shown in FIG. XV, the plant stand is formed in a rectangular configuration in horizontal cross section, and in this embodiment the plant stand may be generally square in horizontal cross section or extended laterally in the form of a rectangle, as shown. This embodiment is illustrative of various polygonal shapes in which the plant stand may be constructed, as noted above. The plant stand is provided with a rectangular base, not shown, formed generally to the configuration of a rectangular plant container 108. The plant container 108 includes upwardly and outwardly extending side walls 109 which terminate in a downturned edge flange 110, as indicated previously in the other embodiments. The plant container 108 rests upon a side wall member in the form of outer side walls 111 laterally spaced on opposite sides of the plant container. In this embodiment, the end portions of the side wall member may be left open or provided with end wall sections 112 spaced apart as particularly indicated in FIG. 15 to provide for ventilation of the interior lights and easy access to the same for assembly and servicing. The bottom portion 113 of the plant container 108 is centrally supported by an upper support member 114 which is elongated or generally elliptical in configuration for easy assembly and is carried by a central support 115 which is also elliptical in cross section and provided with a reflective or mirrored surface for directing the light outwardly from the center of the plant stand. The upper support member 114 carries upper terminal connector fixtures 116 for electrical connection with the upper ends of fluorescent tubes 117 which are laterally spaced generally as shown in FIG. XV and arranged as in the previous embodiments. The central support 115 is mounted on or friction fitted on a downturned elliptical flange 118 on the upper support member 114, in the manner more specifically described with respect to the embodiment of FIGS. II-V. In this embodiment, the bottom perimetric edge of the plant container 108 is formed with a downturned drip edge 119 for directing any condensation or leaking moisture outwardly of the laterally spaced fluorescent tubes 117. The light connector fixtures 116 are connected in the manner previously described for other embodiments by suitable wiring extending through a diametric bore 120 in the upper end of the flange 118, with the wiring extending downwardly through the central support 115. In further detail, the plant stand of this embodiment corresponds generally to the embodiment of FIGS. II-V.

Several characteristics and advantages of this invention have been set forth in the foregoing description, together with details of the structure and function of the invention, and the novel features thereof are pointed out in the appended claims. The disclosure, however, is illustrative only, and changes may be made in detail and especially in matters of shape, materials used, manufacturing details and arrangement of parts, within the principle of the invention, to the full extent encompassed by the broad general meaning of the terms in which the appended claims are expressed:

I claim:

1. A lighted plant stand for houseplants, comprising:
   a base;
   a plant holder spaced upwardly above the base and adapted to support a house plant of the type with foliage which extends outwardly and downwardly therefrom;
   means for supporting said plant holder on said base, said supporting means including a vertical light pervious cylinder support member extending between said base and said plant holder thereby holding said plant holder and base in vertical spaced relationship; and
   an electrical light disposed within said light pervious cylinder support member for providing growing light for the plant foliage and for backlighting such foliage from within the space below said plant holder, said electric light being spaced radially inwardly from said cylinder support member to provide an air space therebetween, said cylinder support member preventing said foliage from contacting the hot surface of said electric light.

2. A device in accordance with claim 1 wherein said electric light is of a wattage balanced between an upper amount for sustained plant growth and a lower amount which will not cause the plant foliage to grow substantially toward the light.

3. A device in accordance with claim 1 wherein said support member is transparent.

4. A device in accordance with claim 1 wherein said support member is perforate.

5. A device in accordance with claim 1 wherein said base, said plant holder and said support member are generally circular in outer configuration and of the same approximate diameter, said support member comprising a light pervious cylinder mounted at its bottom on said base and at its top supporting said plant holder, and said electric light comprising a fluorescent light mounted between said base and said plant holder and within said light pervious cylinder support member.

6. A device in accordance with claim 3 wherein said transparent cylinder support member has at least one aperture near its bottom and at least one aperture near its top for ventilating the heat produced by said electric light.

7. A device in accordance with claim 5 wherein said plant stand further comprises a generally vertically disposed center support mounted generally centrally on said base and in which said center support includes an upper end portion which supports a central portion of said plant holder.

8. A device in accordance with claim 7 wherein said vertical support further comprises a central cylinder of a diameter which is at least approximately one-half less than the diameter of said light pervious cylinder support member, and wherein said electric light further comprises at least a pair of elongated fluorescent lights mounted vertically between said light pervious cylinder support member and said central cylinder and spaced generally of equal distance about said central cylinder.

9. A device in accordance with claim 8 wherein said central cylinder further includes a light reflective outer surface for reflecting the radially inwardly directed rays from said fluorescent lights back radially outwardly from said central cylinder and through said cylinder support member.

10. A device in accordance with claim 7 wherein said plant stand further comprises an upper support member mounted on the upper end portion of said vertical support and extending outwardly on opposite sides thereof and having upper and lower surfaces, wherein the upper ends of said fluorescent lights are mounted on the lower surface of said upper support member, and wherein the upper surface of said support member supports said plant holder.

11. A device in accordance with claim 10 wherein said upper support member extends outwardly of the upper ends of said fluorescent lights and wherein said upper support member is provided with a downturned drip edge adjacent said fluorescent lights for draining any moisture leaking from said plant holder downwardly and outwardly of said fluorescent lights.

12. A device in accordance with claim 5 wherein said plant holder further comprises a generally annular edge flange which extends outwardly over the upper end of said cylinder support member and downwardly thereover for draining any moisture from said plant holder outwardly over said cylinder support member.

13. A device in accordance with claim 1 wherein said vertical support member is formed with a vertically extending wall formed of reticulate sheet material having a large number of apertures to permit light from said electric light to pass outwardly through said vertical support member.

14. A device in accordance with claim 13 wherein the inner surface of the wall of said vertical support member is formed with a light reflective surface.

15. A device in accordance with claim 7 wherein said base further comprises an upper base plate member and an outer side wall member extending downwardly from said base plate member to define a chamber below said base plate member, wherein the outer side wall of said base retains the bottom portion of said light pervious cylinder support member, wherein a ballast transformer for said fluorescent light is mounted within said chamber, and wherein said base plate member includes an aperture for ventilating any heat produced by said ballast transformer out of said chamber.

16. A device in accordance with claim 8 or claim 15, wherein said base plate member has a central aperture, said central cylinder is mounted at its bottom end portion on said base plate member over said central aperture thereof, wherein said central cylinder includes at least one aperture adjacent its bottom and at least one aperture adjacent its top for venting any heat produced by said ballast transformer through said central aperture of the base plate member and upwardly through said apertures in said central cylinder, and wherein the wiring for the upper ends of said fluorescent lights is disposed within said central cylinder.

17. A device in accordance with claim 5 wherein said plant holder comprises a plant container of a typical flowerpot configuration in the form of a truncated conical shape having a generally flat bottom portion, the outer edge of which connects with an upwardly and outwardly diverging side wall portion terminating in an upper annular edge portion, wherein said upper annular edge portion of said plant container defines a downturned annular edge flange formed to extend downwardly over the upper end portion of said light pervious cylinder support member.

18. A device in accordance with claim 17 wherein the upper end of said fluorescent light is mounted inwardly of the outer edge of the bottom wall portion of said plant holder.

19. A device in accordance with claim 1 wherein said electric light comprises a circular fluorescent light mounted between said base and said plant holder.

20. A device in accordance with claim 19 wherein said circular fluorescent light includes a housing mounted on said base of the plant stand, said housing having an upper surface with a circular fluorescent tube of said light being disposed outwardly of said upper surface of said housing, and wherein said plant stand further comprises an upper support member mounted on the upper surface of said housing and extending upwardly therefrom and including an upper plate member positioned to support said plant holder.

21. A device in accordance with claim 20 wherein the upper plate member of said upper support member defines a peripheral downturned edge flange disposed outwardly of said circular fluorescent tube for draining any moisture from said plant holder outwardly of said fluorescent tube.

22. A device in accordance with claim 7 wherein said vertical support comprises a generally rigid central support tube mounted at its lower end portion generally centrally on said base, and wherein said plant stand further comprises an upper support member mounted on the upper end portion of said central support tube, said central support tube carrying the electrical wiring for the upper end of said fluorescent lights from said base.

23. A device in accordance with claim 1 wherein said vertical support member comprises at least a pair of upstanding struts, the lower end portions of said struts being mounted on said base and the upper end portions of said struts supporting said plant holder.

24. A device in accordance with claim 23 wherein said plant stand further comprises an upper support member mounted between the upper end portions of said struts, and wherein said electric light includes at least one fluorescent tube mounted in the space between said base and said upper support member.

25. A device in accordance with claim 23 wherein said plant stand further comprises a generally triangular-shaped upper support yoke member having three arm portions which extend outwardly in generally radially equally-spaced directions, wherein said vertical support member comprises three generally rigid upstanding struts mounted at their lower end portions on said base and connected at their upper end portions to said arms of said upper support yoke member, and wherein said electric light comprises three generally vertically disposed and equally-spaced fluorescent lights, the upper end portions of which are mounted on said upper support yoke member.

26. A device in accordance with claim 1 wherein said plant holder comprises a generally flat upper plate member, the upper surface of which is adapted to hold a potted plant, and wherein said upper plate member comprises an outer downturned edge portion extending over the upper end portion of said vertical support member.

27. A device in accordance with claim 26 wherein said upper plate member is provided with a lower surface, and wherein said electric light comprises at least a pair of vertically disposed elongated fluorescent lights the upper end portions of which are mounted on the bottom surface portion of said upper plate member.

28. A device in accordance with claim 26 wherein said upper plate member is formed of a light pervious material to permit the passage therethrough of light rays from said electric light.

29. A device in accordance with claim 1 wherein said plant holder is polygonal in outer configuration and has at least three side portions.

30. A device in accordance with claim 29 wherein said base and said plant holder are polygonal in outer configuration and define at least three side portions, and wherein said vertical support member includes at least a pair of vertically disposed wall portions extending between said base and said plant holder.

31. A device in accordance with claim 1 or 7, or 10 or 11 or 12, wherein said base and said plant holder are rectangular in outer confituration and of generally equal size with aligned side portions, wherein said vertical support member comprises a pair of laterally spaced wall members extending between and on opposite sides of said base and said plant holder.

32. A device in accordance with claim 2 wherein said electric light is of a wattage comprising approximately 20 to 30 watts for a stand of approximately 10 inches in diameter.

33. A device in accordance with claim 2 wherein said electric light is of a wattage comprising approximately 20 to 30 watts per foot of plant stand height for a stand of approximately 10 inches in diameter.

34. A lighted plant stand for houseplants, comprising:
a base member having an upwardly opening channel defined around the peripheral edge thereof;
a center support member mounted on said base member;
a plurality of lights mounted on said base member and circumferentially spaced around said center support member;
a light pervious outer cylindrical member mounted on said base member, the lower edge of said cylindrical member resting in the channel of said base member; and
a plant receptacle having a bottom wall, an integral substantially vertical tubular side wall and a downturned annular edge flange integral with the upper edge of said tubular wall, said receptacle being disposed with said bottom wall resting on said center support member and with said annular edge flange entrapping the upper edge of said cylindrical member, said cylindrical member serving to pass light through to foliage hanging downwardly around said cylinderical member and still restraining said foliage from reaching the heated surface of said lights.

* * * * *